(12) United States Patent
Takehara et al.

(10) Patent No.: US 6,177,202 B1
(45) Date of Patent: Jan. 23, 2001

(54) POWER TRANSMISSION BELT

(75) Inventors: Tsuyoshi Takehara; Toshimichi Takada, both of Kobe (JP)

(73) Assignee: Mitsuboshi Belting Ltd., Kobe (JP)

( * ) Notice: Under 35 U.S.C. 154(b), the term of this patent shall be extended for 0 days.

(21) Appl. No.: 09/179,296

(22) Filed: Oct. 27, 1998

(30) Foreign Application Priority Data

Oct. 31, 1997 (JP) .................................................. 9-315817

(51) Int. Cl.[7] .............................. C08K 5/09; F16G 1/02; B32B 27/08
(52) U.S. Cl. ......................... 428/515; 428/137; 428/156; 428/161; 428/162; 428/163; 428/297.1
(58) Field of Search ..................................... 474/202, 237, 474/271, 250, 260, 263; 428/137, 156, 161, 162, 163, 515, 297.1

(56) References Cited

U.S. PATENT DOCUMENTS 5,860,883 * 1/1999 Jonen et al. .

* cited by examiner

*Primary Examiner*—Richard Weisberger
(74) *Attorney, Agent, or Firm*—Wood, Phillips, VanSanten, Clark & Mortimer

(57) ABSTRACT

A power transmission belt having a body with a length and defined by a cushion rubber layer having at least one load carrying cord embedded therein and extending lengthwise with respect to the body, and a compression section made at least partially from rubber. The cushion rubber layer has a rubber composition including an ethylene-α-olefin elastomer capable of being cross-linked with sulfur. The rubber in the compression section is a rubber composition made from an ethylene-α-olefin elastomer capable of being cross-linked with an organic peroxide.

20 Claims, 1 Drawing Sheet

POWER TRANSMISSION BELT

BACKGROUND OF THE INVENTION

1. Field of the Invention

This invention relates to elongate power transmission belts having at least one rib extending lengthwise of the belt.

2. Background Art

The ever increasing demand for energy savings has caused the proliferation of compact automobiles. Compacting of automobiles has resulted in the engines thereon being operated in relatively small compartments. As a result, the power transmission belts used in this environment are commonly subjected to high operating temperatures.

It is known to make power transmission belts using natural rubber, styrenebutadiene rubber and chloroprene rubber. In the high temperature environment of the engine compartment, the rubber in the compression section of the belts is prone to cracking at an early stage in the anticipated belt life.

To address this problem, improvements in chloroprene rubber have been investigated, with some improvements having already been made. However, so long as chloroprene rubber is used, there is a limit to the amount of improvement that can be made in this regard. There exists a need for further improvement.

As an alternative, the use of a rubber wherein the main chain is highly or completely saturated, such as chlorosulfonated polyethylene rubber, hydrogenated nitrile rubber, fluorine rubber, etc. has been investigated. These rubbers have excellent heat resistance. Of these rubbers, chlorosulfonated polyethylene rubber is generally the same as chloroprene rubber in terms of its dynamic fatigue, abrasion resistance, and oil resistance. Vulcanization, and in particular, the use of an acid acceptor improves water resistance. Typically, as an acid acceptor for chlorosulfonated ethylene rubber, an oxide such as MgO, PbO, or the like, is used.

However, while an acid acceptor made up of a lead compound such as PbO, $Pb_3O_4$, etc. enhances water resistance, the use of a lead compound is undesirable because of environmental concerns and hygiene. If MgO is used as the acid acceptor, water resistance is greatly deteriorated with $MgCl_2$ formed during the cross-linking reaction. Thus, the application of MgO to a belt is not practical. On the other hand, when an epoxy-based acid acceptor is used as an acid acceptor instead of metal oxides, a composition having good water resistance can be obtained. However, the product produces an unpleasant smell, making it unpleasant for those exposed to the product.

Power transmission belts using a chlorosulfonated polyethylene rubber have a longer running life in high temperature environments and better heat resistance compared to belts using chloroprene rubber. However, the running life of the power transmission belt using a chlorosulfonated polyethylene rubber deteriorates greatly in a low temperature environment i.e. on the order of −30° C. or lower. It is presumed that this shortcoming is attributable to the fact that because conventional chlorosulfonated rubber is obtained by chlorosulfonating polyethylene and contains chlorine, the aggregation energy of chlorine becomes high at a low temperature. Curing of the rubber occurs at a low temperature to reduce the rubber elasticity, with the rubber being prone to becoming cracked.

On the other hand, an ethylene-α-olefin elastomer such as an ethylene-propylene-based rubber (EPR), an ethylene-propylene-diene-based rubber (EPDM), etc. has excellent heat resistance and cold resistance and is a relatively inexpensive polymer. However, because the elastomers do not have good oil resistance, these rubbers have not been used in environments in which they will be exposed to oil. For example, in dry frictional transmission such as with a V-ribbed belt, when a large amount of oil is applied, the belt tends to slip, making it impractical for this use. Use of such a belt has been investigated and is disclosed in, for example, JP-A-6-345948.

The ethylene-propylene-based rubber generally has a low tearing strength. When a peroxide-based cross-linking system is used, the tearing strength lowers even further, as a result of which there may be a problem with load carrying cords popping out during running.

On the other hand, with the ethylene-propylene-based rubber using a sulfur-base cross-linking system, because it is difficult to sufficiently increase the degree of vulcanization, belt abrasion during running increases. In the case of V-ribbed belts, abraded powders may accumulate at the root between adjacent ribs. Sticking abrasion may occur, which may generate unwanted noise.

Also, with EPDM having a very large number of double bonds in the molecules is used to increase the degree of vulcanization, the problem of the sticking abrasion can be alleviated to a certain extent, however, this has resulted in a lowering of the heat resistance.

SUMMARY OF THE INVENTION

The invention is directed to a power transmission belt having a body with a length and defined by a cushion rubber layer having at least one load carrying cord embedded therein and extending lengthwise with respect to the body, and a compression section made at least partially from rubber. The cushion rubber layer has a rubber composition including an ethylene-α-olefin elastomer capable of being cross-linked with sulfur. The rubber in the compression section is a rubber composition made from an ethylene-α-olefin elastomer capable of being cross-linked with an organic peroxide.

One objective of the present invention is to provide a power transmission belt which has a long running life and which is capable of operating in both high and low temperature environments, while at the same time having excellent weather resistance.

In one form, the rubber composition in the compression section is cross-linked with an organic peroxide comprising at least one of a) dicumyl peroxide, b) di-t-butyl peroxide, c) t-butylcumyl peroxide, d) benzoyl peroxide, e) 1,3-bis(t-butylperoxyisopropyl)benzene, f) 2,5-dimethyl-2,5-di(t-butylperoxy)hexine-3, g) 2,5-dimethyl-2,5-(benzoylperoxy)hexane, and h) 2,5-dimethyl-2,5-mono(t-butylperoxy)hexane.

The organic peroxide may be present in an amount of 0.005 to 0.02 g per 100 g of ethylene-α-olefin elastomer.

The rubber in the compression section may be formed using a cross-linking co-agent.

In one form, the cross-linking co-agent is at least one of a) TIAC, b) TAC, c) 1,2-polybutadiene, d) metal salts of an unsaturated carboxylic acid, e) oximes, f) guanidine, g) trimethylolpropane trimethacrylate, h) ethylene glycol dimethacrylate, i) N,N'-m-phenylenebismaleimide, and j) sulfur.

The rubber in the compression section may be formed using at least one of a) a reinforcing agent, b) a reinforcing agent comprising at least one of carbon black and silica, c) a filler, d) a filler comprising at least one of calcium carbonate and talc, e) a plasticizer, f) a stabilizer, g) a processing aid, and h) a coloring agent.

The rubber in the compression section may be mixed with short fibers that are at least one of a) nylon 6, b) nylon 66, c) polyester, d) cotton, and e) aramid.

The short fibers may have a length of 1–20 mm and be present in an amount of 1–30 parts by weight per 100 parts by weight of ethylene-α-olefin elastomer.

The short fibers may be aramid fibers.

The rubber in the compression section may include short fibers graft bonded to the ethylene-α-olefin elastomer, with the short fibers having a diameter no greater than 1.0 μm and being present in an amount of from 1–50 parts by weight of fiber per 100 parts by weight of ethylene-α-olefin elastomer.

The short fibers and ethylene-α-olefin elastomer may be graft bonded using an adhesive that is at least one of a) a coupling agent, b) a silane coupling agent, c) a silane coupling agent that is at least one of i) vinyl tris(β-methoxyethoxy)silane, ii) vinyl triethyoxysilane, and iii) γ-methacryloxypropyl trimethoxysilane, d) a titanate-based coupling agent; e) isopropyl triisostearoyl titanate, f) an unsaturated carboxylic acid, g) an unsaturated carboxylic acid comprising at least one of i) acrylic acid, ii) methacrylic acid, and iii) maleic acid, and h) a novolak-type phenol resin.

The rubber composition of the cushion rubber layer may be formed using at least one of a) a reinforcing agent, b) a reinforcing agent that is at least one of carbon black and silica, c) a filler, d) a filler that is at least one of calcium carbonate and talc, e) a plasticizer, f) a stabilizer, g) a processing aid, and h) a coloring agent.

The rubber composition in the cushion rubber layer may be cross-linked with sulfur in an amount of 0.5 to 3.0 parts by weight per 100 parts by weight of ethylene-α-olefin elastomer.

The load carrying cord may be made from at least one of polyester fiber, aramid fiber, and glass fiber.

The fibers in the load carrying cord may be subjected to an adhesion treatment performed by at least one of a) immersing the fibers in the load carrying cord in a resorcinol-formalin-latex liquid, and b) pre-treating the fibers in the load carrying cord with at least one of an epoxy compound and an isocyanate compound and thereafter treating the fibers on the load carrying cord with a resorcinol-formalin-latex liquid.

A cover canvas may be provided on the body.

The power transmission belt may be one of a V-belt and a V-ribbed belt.

The power transmission belt may have at least one rib formed in the compression section.

The ethylene-α-olefin elastomer may be at least one of ethylene-propylene-diene-based rubber (EPDM) and ethylene-propylene-based rubber (EPM).

In one form, the body has laterally spaced sides to engage a cooperating pulley and the short fibers project laterally and outwardly from the laterally spaced sides of the body.

DETAILED DESCRIPTION OF THE DRAWINGS

Figure 1:
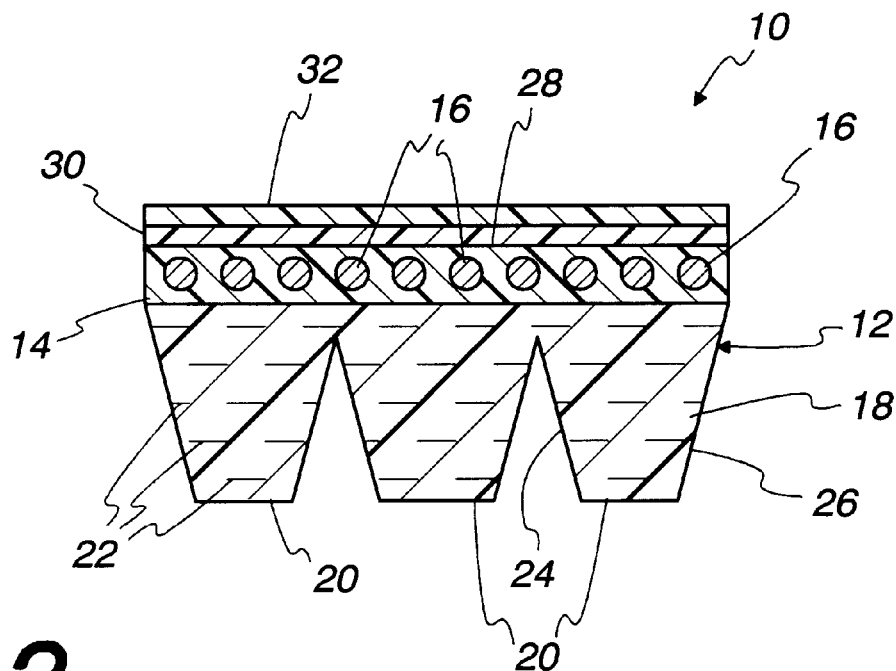
FIG. 1 is a cross-sectional view of a V-ribbed belt made according to the present invention.

A V-ribbed belt, made according to the present invention, is shown at 10 in FIG. 1. The belt 10 has a body 12 with a cushion rubber layer 14 having load carrying cords 16 embedded therein and extending lengthwise of the belt body 12, i.e. into the page in FIG. 1. The body 12 has a compression section 18 through which a plurality of, and in this case three, V-shaped ribs 20 are formed. Short reinforcing fibers 22 are embedded in the compression section 18 and have lengths aligned laterally with respect to the belt body 12. Each rib 20 has laterally spacing side surfaces 24, 26 from which the fibers 22 project. The cushion rubber layer 14 has a surface 28 to which rubber impregnated canvas layers 30, 32 are attached.

A typical ethylene-α-olefin elastomer used for the compression section 18 is EPDM, which is a rubber made up of an ethylene-propylene-diene monomer. Examples of the diene monomer are dicyclopentadiene, methylene norbornene, ethylidene norbornene, 1,4-hexadiene, and cyclooctadiene. An ethylene-propylene-based rubber (EPR) can also be used.

For cross-linking the above rubber, an organic peroxide that is at least one of a) dicumyl peroxide, b) di-t-butyl peroxide, c) t-butylcumyl peroxide, d) benzoyle peroxide, e) 1,3-bis(t-butylperoxyisopropyl)benzene, f) 2,5-dimethyl-2,5-di(t-butylperoxy)hexine-3, g) 2,5-dimethyl-2,5-(benzoylperoxy)hexane, and h) 2,5-dimethyl-2,5-mono(t-butyl-peroxy)hexane can be used.

By compounding a cross-linking co-agent, the degree of cross-linking can be increased, thereby reducing the problems of sticking abrasion, etc. The cross-linking co-agent may be those which are normally used for peroxide cross-linking, such as a) TIAC, b) TAC, c) 1,2-polybutadiene, d) metal salts of an unsaturated carboxylic acid, e) oximes, f) guanidine, g) trimethylolpropane trimethacrylate, h) ethylene glycol dimethacrylate, i) N,N'-m-phenylenebismaleimide, j) sulfur, etc., can be used.

If necessary, additives used ordinarily in rubber compounds, such as reinforcing agents (such as carbon black and silica), fillers (such as calcium carbonate and talc), plasticizers, stabilizers, processing aids, coloring agents, etc., can be used.

The fibers 22 mixed in the rubber of the compression section 18 may be nylon 6, nylon 66, polyester, cotton, or aramid. These fibers improve the lateral pressure resistance in the compression section 18. Preferably, the fibers 22 project from the side surfaces 24, 26 which contact a cooperating pulley so that the coefficient of friction between the rubber and the compression section 18 and the pulley is lowered to reduce noise generation during operation. Of the above described fibers, aramid fibers, with good rigidity, strength, and abrasion resistance, are preferred.

To maximize the effect of the aramid fibers 22, the fibers 22 have a length preferably from 1 to 20 mm and are present in an amount of from 1 to 30 parts by weight per 100 parts by weight of the ethylene-α-olefin elastomer. The aramid fibers are preferably an aramid having an aromatic ring in the molecular structure. Suitable fibers are currently sold commercially under the trademarks CONEX™, NOMEX™, KEVLAR™, TECHNORA™, TWARON™, etc.

If the amount of aramid fiber 22 is less than one part by weight, the rubber in the compression section 18 is prone to becoming sticky and being abraded. If the amount exceeds 30 parts by weight, the short fibers 22 may not uniformly disperse in the rubber. However, the use of fibers 22 is not required to practice the present invention. Further, short fibers made of other materials may be used.

The compression section 18 may be made from rubber with fine, short, reinforcing fibers therein. The fiber-reinforced rubber may be formed by graft bonding ethylene-α-olefin elastomer and fine short fibers. These fine short fibers have a diameter of not larger than 1.0 μm and are preferably in a length range of 0.05 to 0.8 μm. These fibers are present preferably in an amount of 1 to 50 parts by weight and more preferably 5 to 25 parts by weight of fiber per 100 parts by weight of the ethylene-α-olefin elastomer. If the fine short fibers are present in less than 1 part by weight, abrasion resistance may be insufficient. If the amount exceeds 50 parts by weight, the elongation of the rubber composition may be undesirably lowered. Additionally, heat resistance and bending resistance may be lowered significantly.

The rubber reinforced with the fine fibers is joined effectively with a matrix rubber in the compression section 18 because the ethylene-α-olefin elastomer in which the fine fibers are provided has qualities the same as or similar to the ethylene-α-olefin elastomer as the matrix of the compression section 18. Because the rubber reinforced with the fine fibers is chemically bonded to the matrix rubber, or the ethylene-α-olefin elastomer is chemically bonded to the fine short fibers, the compression section 18 resists cracking. Even if cracking occurs, the cracks do not readily propagate.

In the rubber reinforced with the fine fibers, the interface between the fine fibers and the ethylene-α-olefin elastomer is grafted using an adhesive such as a) a coupling agent, b) a silane coupling agent that is at least one of i) vinyl tris(β-methoxyethoxy)silane, ii) vinyl triethyoxysilane, iii) γ-methacryloxypropyl trimethoxysilane, etc., c) a titanate-based coupling agent such as isopropyl triisostearoyl titanate, etc., d) an unsaturated carboxylic acid, such as i) acrylic acid, ii) methacrylic acid, and iii) maleic acid, and e) a novolak-type phenol resin, etc.

The rubber reinforced with the fine fibers is obtained by kneading the ethylene-α-olefin elastomer, the fine short fibers, and adhesive, such as a coupling agent, at a temperature higher than the melting temperature of the short fibers. The mixture is then extruded.

In the rubber reinforced with fine fibers, a rubber component exists as a continuous phase in which the fine short fibers are dispersed in a fine state. The fine short fibers are strongly chemically bonded or are interactive with the rubber component at the interface. Thus, the rubber layer containing the rubber reinforced with fine fibers resists cracking and crack propagation. The belt using this rubber layer may have excellent heat resistance, cold resistance, bending resistance, and abrasion resistance.

The load carrying cord 16 in the cushion rubber layer 14 preferably is made from polyester fiber, aromatic polyamide fiber, or glass fiber, to produce a high strength and low-ductility cord 16. To provide good heat resistance and adhesion with the load carrying cords 16, the rubber in the cushion rubber layer 14 is made using an ethylene-α-olefin elastomer which can be cross-linked with sulfur. As with the rubber in the compression section 18, additives such as reinforcing agents (such as carbon block, silica, etc.), fillers (such as calcium carbonate, talc, etc.), plasticizers, stabilizers, processing aids, coloring agents, etc. can be used.

Of the ethylene-α-olefin elastomers used for the cushion rubber layer 14, EPDM preferably has an iodine value of 4 or more but less than 40. If the iodine value is less than 4, the cross-linking of the rubber composition with sulfur is insufficient. As a result, pop out of the load carrying cords 16 may occur. On the other hand, if the iodine value exceeds 40, scorching of the rubber composition is shortened. The heat resistance may be lowered.

The above-described rubber reinforced with fine short fibers can be incorporated into the cushion rubber layer 14 as well.

Preferably, the sulfur in the cushion rubber layer 14 is present from 0.5 to 3.0 parts by weight per 100 parts by weight of the ethylene-α-olefin elastomer.

The load carrying cords 16 are subjected to an adhesion treatment to improve the adhesion with the rubber in the cushion rubber layer 14. In one form of adhesion treatment, the fibers of the load carrying cord 16 are immersed in resorcinol-formalin-latex liquid (RFL liquid) and dried by heating to form a uniform adhesive layer on the surfaces thereof. It is also possible to pre-treat the fibers with an epoxy compound or isocyanate compound and thereafter to treat the fibers with the RFL liquid.

There is no particular restriction on the method of mixing the above components. They may be kneaded by known means or a method using, for example, a Banbury mixer, a kneader, etc.

Production of a V-ribbed belt, according to the present invention, may occur as follows. After initially winding one or more cover canvas layers 30, 32 around a cylindrical molding drum, a cushion rubber layer 14 is applied. Load carrying cords 16 made up of rope are spirally wound over the cushion rubber layer 14, after which a compression section/layer 18 is applied to obtain a laminate. The laminate is cross-linked with sulfur or an organic peroxide to obtain a cross-linked sleeve.

The cross-linked sleeve is trained around driving and driven rolls and driven therearound at a predetermined tension. A grinding wheel is brought into contact with the moving, cross-linked sleeve to form 3–100 grooves simultaneously on the exposed surface of the compression section 18.

The cross-linked sleeve is then removed from the rolls and trained around separate driving and driven rolls, on which it is driven and cut to a desired width by a cutter to produce finished V-ribbed belts 10.

Figure 2:
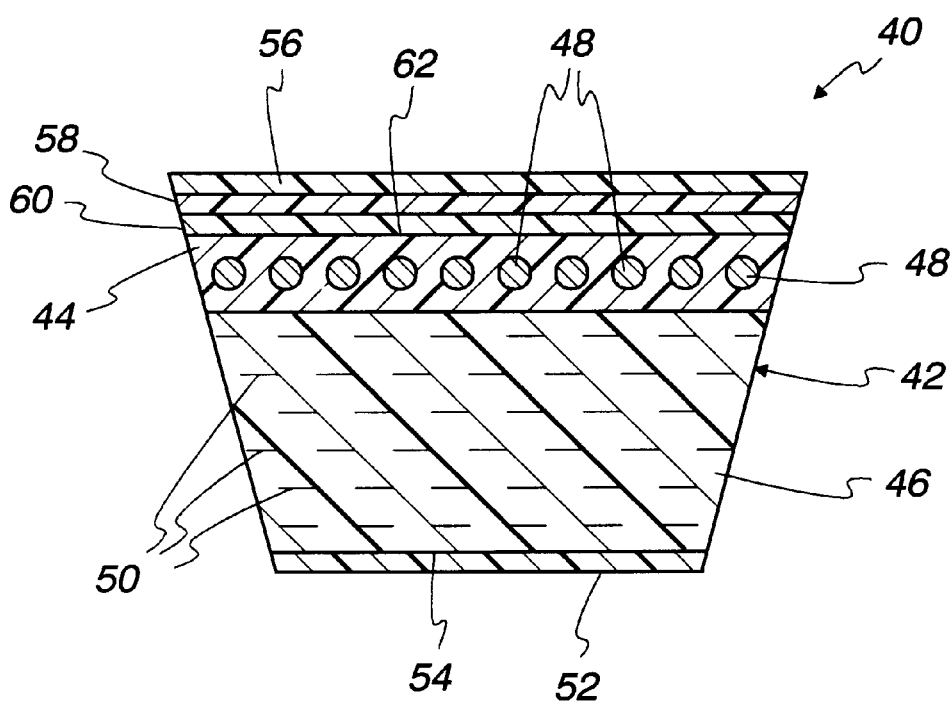
FIG. 2 is a cross-sectional view of a V-belt made according to the present invention.

In addition to the V-ribbed belt 10, the invention is also capable of being used for a V-belt shown at 40 in FIG. 2. The V-belt 40 has a body 42 with a cushion rubber layer 44 and a compression section/layer 46. Load carrying cords 48 are embedded in the cushion rubber layer 44. Reinforcing fibers 50 are embedded in the compression section 46. A single cover canvas layer 52 is applied to a surface 54 of the compression section 46, with three such layers 56, 58, 60 applied to a surface 62 on the cushion rubber layer 44. Cogs can be provided at predetermined intervals along the belt length.

The composition of the cushion rubber layer 44 and compression section 46 can be the same as described above.

The invention can now be described with respect to the following example. Load carrying cords 16 made up of polyester fibers were embedded in a cushion rubber layer 14. One layer of a machine-joined rubber impregnated canvas 30, 32 was placed over the cushion rubber layer 14. A compression section/compression rubber layer 18 was applied to the cushion rubber layer 14. Three ribs 20 were formed in the compression section 18. The V-ribbed belt obtained was a K-type, three ribbed belt with a length of 975 mm by the RMA standards, with a rib pitch of 3.56 mm, a rib height of 2.9 mm, a belt thickness of 5.3 mm, and a rib angle of 40°.

The rubber in the compression section 18 and in the cushion rubber layer 14 were prepared using the compositions as shown in Table 1, below.

TABLE 1

| Compound No. | Compression Rubber Layer (weight parts) | | | Cushion rubber layer (weight parts) | | |
|---|---|---|---|---|---|---|
| | R1 | R2 | R3 | C1 | C2 | C3 |
| EPDM Mitsui 4045 | 100 | 100 | 100 | 100 | 100 | 100 |
| Nylon cut yarn | 10 | 10 | 10 | — | — | — |
| Aramid cut yarn | 10 | 10 | 10 | — | — | — |
| Stearic acid | 1.5 | 1.5 | 1.5 | 0.5 | 0.5 | 0.5 |
| Zinc oxide | 5 | 5 | 5 | 5 | 5 | 5 |
| HAF carbon black | 55 | 55 | 55 | 40 | 40 | 40 |
| paraffin oil | 15 | 15 | 15 | 15 | 15 | 15 |
| Hydrous silica | — | — | — | 15 | 15 | 15 |
| Vulcanization accelerator (1) | — | — | 1 | — | 1 | — |
| Vulcanization accelerator (2) | — | — | 0.5 | — | 0.5 | 0.6 |
| Vulcanization accelerator (3) | — | — | 1 | — | 1 | — |
| Vulcanization accelerator (4) | — | — | — | — | — | 0.5 |
| Vulcanization accelerator (5) | — | — | — | — | — | 2 |
| Sulfur | — | — | 1 | — | 1 | 0.8 |
| Peroxide (6) | 8 | — | — | 8 | — | — |
| Peroxide (7) | — | 2 | — | — | — | — |
| Cross-linking co-agent (8) | 2 | 2 | — | 2 | — | — |

(1) Tetramethylthiuram disulfide (TMTD)
(2) Dipentamethylenethiuram tetrasulfide (DPTF)
(3) N-cyclohexyl-2-benzothiazyl-sulfenamide (CBS)
(4) Tetramethylthiuram monosulfide
(5) Tellurium diethyldithiocarbamate
(6) Dicumyl peroxide (40%)

TABLE 1-continued

| Compound No. | Compression Rubber Layer (weight parts) | | | Cushion rubber layer (weight parts) | | |
|---|---|---|---|---|---|---|
| | R1 | R2 | R3 | C1 | C2 | C3 |

(7) 1,3-Bis-(1-butyl peroxy isopropyl)benzene (>98%)
(8) N,N'-m-Phenylenedimaleimide After kneading each rubber composition in a Banbury mixer, the kneaded mixture was rolled by a calender roll to prepare the compression rubber layer 18 and the cushion rubber layer 14. The compression section 18 contained short fibers 22, oriented laterally with respect to the belt.

To produce the belt 10, first a ply of the machine joined, rubber impregnated cotton canvas 30, 32 was placed around a flat, cylindrical mold. The cushion rubber layer 14 was wound therearound followed by load carrying cords 16 which were spun spirally over the cushion rubber layer 14. The compression rubber layer 18 was then applied to complete a sleeve. A jacket for cross-linking was placed surroundingly over the sleeve. The jacket covered sleeve was then placed in a vulcanization can. After cross-linking, the cross-linked sleeve was removed from the mold, after which ribs 20 were formed through a grinder. Each belt 10 was then cut to width.

After forming each belt 10, various tests were performed, including a peeling test for the load carrying cords 16 from the cushion rubber layer 14, a heat-resistance running test, and an evaluation of the presence or absence of sticking abrasion which was detected by a running test at room temperature. The results are shown in Tables 2 and 3, below.

TABLE 2

| | Example 1 | | Example 2 | | Example 3 | | Comparative Example 1 | | Comparative Example 2 | |
|---|---|---|---|---|---|---|---|---|---|---|
| Cushion rubber layer | C2 Sulfur | | C3 Sulfur | | C2 Sulfur | | C1 Peroxide | | C2 Sulfur | |
| Compression Rubber layer | R1 Peroxide | | R1 Peroxide | | R2 Peroxide | | R1 Peroxide | | R3 Sulfur | |
| Atmospheric Temperature (° C.) | 23 | 120 | 23 | 120 | 23 | 120 | 23 | 120 | 23 | 120 |
| Adhesive force (N) (Peeling force of two load carrying members) | 42.0 | 12.8 | 40.5 | 11.9 | 42.5 | 12.3 | 21.0 | 4.0 | 54.0 | 16.0 |

TABLE 3

| | Example 1 | Example 2 | Example 3 | Comparative Example 1 | Comparative Example 2 |
|---|---|---|---|---|---|
| Cushion rubber layer | C2 Sulfur | C3 Sulfur | C2 Sulfur | C1 Peroxide | C2 Sulfur |
| Compression rubber layer | R1 Peroxide | R1 Peroxide | R1 Peroxide | R1 Peroxide | R2 Sulfur |
| Presence of pop-out after running for 100 hours | None | None | None | Pop-out of 30 mm occurred after 24 hours | None |
| Presence of sticking abrasion | None | None | None | None | Yes |

In the peeling test, using Strograph T, two load carrying members 16 of the belt 10 were peeled at a rate of 50 mm/minute at an atmospheric temperature of 23° C. and 120° C.

The apparatus used in the heat-resistance running test had a driving pulley with a 120 mm diameter and a driven pulley having a 120 mm diameter. The system used a 70 mm diameter idler pulley and a 45 mm diameter tension pulley. Each belt was hung on the pulleys of the test apparatus with the atmospheric temperature at 120° C. The driving pulley was operated at 4900 rpm with a load on the driven pulley of 12 horsepower. The belt 10 was run by applying an initial tension of 57 kgf to the tensioning pulley.

The idler pulley was engaged with the back surface of the belt 10, with the wrap angle of the belt at approximately 90°. In this test method, the time until cracks were formed in the rib portion of the belt 10 was measured. The heat resistance capabilities were determined.

In the evaluation of the presence or absence of sticking abrasion at room temperature, a test setup was used having a 120 mm diameter driving pulley, a 120 mm diameter driven pulley, an 85 mm diameter idler pulley and a 45 mm diameter tension pulley. The driving pulley was operated at 4900 rpm, with the belt run by applying an initial tension of 85 kgf to the tension pulley.

It can be seen from the results in Tables 2 and 3 that the belts of the present invention, in which the rubber composition of the ethylene-propylene rubber capable of being cross-linked with an organic peroxide was used in the rib portions and the rubber composition of the ethylene-propylene rubber capable of being cross-linked with sulfur is use for the cushion rubber layer, the adhesive force between the load carrying cords 16 and the cushion rubber layer was increased as compared with a conventional belt. The life of the belt 10 in a high temperature atmosphere was improved. Little sticking abrasion developed.

The foregoing disclosure of specific embodiments is intended to be illustrative of the broad concepts comprehended by the invention.

What is claimed is:

1. A power transmission belt comprising:
   a body having a length and comprising a cushion rubber layer having at least one load carrying cord embedded therein and extending lengthwise with respect to the body and a compression section comprising rubber,
   wherein the cushion rubber layer comprises a rubber composition comprising an ethylene-α-olefin elastomer capable of being cross-linked with sulfur,
   wherein the rubber in the compression section comprises a rubber composition comprising an ethylene-α-olefin elastomer capable of being cross-linked with an organic peroxide.

2. The power transmission belt according to claim 1 wherein the rubber composition in the compression section is cross-linked with an organic peroxide comprising at least one of a) dicumyl peroxide, b) di-t-butyl peroxide, c) t-butylcumyl peroxide, d) benzoyl peroxide, e) 1,3-bis(t-butylperoxyisopropyl)benzene, f) 2,5-dimethyl-2,5-di(t-butylperoxy)hexine-3, g) 2,5-dimethyl-2,5-(benzoylperoxy)hexane, and h) 2,5-dimethyl-2,5-mono(t-butylperoxy)hexane.

3. The power transmission belt according to claim 1 wherein the organic peroxide is present in an amount of 0.005–0.02 g per 100 g of ethylene-α-olefin elastomer.

4. The power transmission belt according to claim 1 wherein the rubber in the compression section is formed using a cross-linking co-agent.

5. The power transmission belt according to claim 4 wherein the cross-linking co-agent comprises at least one of a) TIAC, b) TAC, c) 1,2-polybutadiene, d) metal salts of an unsaturated carboxylic acid, e) oximes, f) guanidine, g) trimethylolpropane trimethacrylate, h) ethylene glycol dimethacrylate, i) N,N'-m-phenylenebismaleimide, and j) sulfur.

6. The power transmission belt according to claim 1 wherein the rubber in the compression section is formed using at least one of a) a reinforcing agent, b) a reinforcing agent comprising at least one of carbon black and silica, c) a filler, d) a filler comprising at least one of calcium carbonate and talc, e) a plasticizer, f) a stabilizer, g) a processing aid, and g) a coloring agent.

7. The power transmission belt according to claim 1 wherein the rubber in the compression section is mixed with short fibers comprising at least one of a) nylon 6, b) nylon 66, c) polyester, d) cotton, and e) aramid.

8. The power transmission belt according to claim 7 wherein the short fibers have a length of 1–20 mm and are present in an amount of 1–30 parts by weight per 100 parts by weight of ethylene-α-olefin elastomer.

9. The power transmission belt according to claim 7 wherein the short fibers comprise aramid fibers.

10. The power transmission belt according to claim 1 wherein the rubber in the compression section comprises short fibers graft bonded to the ethylene-α-olefin elastomer with the short fibers having a diameter no greater than 1.0 μm and present in an amount of from 1–50 parts by weight of fiber per 100 parts by weight of ethylene-α-olefin elastomer.

11. The power transmission belt according to claim 10 wherein the short fibers and ethylene-α-olefin elastomer are graft bonded using an adhesive comprising at least one of a) a coupling agent, b) a silane coupling agent, c) a silane coupling agent comprising at least one of i) vinyl tris (β-methoxyethoxy) silane, ii) vinyl triethoxysilane, and iii) γ-methacryloxypropyl trimethoxysilane, d) a titanate-based coupling agent, e) isopropyl triisostearoyl titanate, f) an unsaturated carboxylic acid, g) an unsaturated carboxylic acid comprising at least one of i) acrylic acid, ii) methacrylic acid, and iii) maleic acid, and h) a novolak-type phenol resin.

12. The power transmission belt according to claim 11 wherein the rubber composition of the cushion rubber layer is formed using at least one of a) a reinforcing agent, b) a reinforcing agent comprising at least one of carbon black and silica, c) a filler, d) a filler comprising at least one of calcium carbonate and talc, e) a plasticizer, f) a stabilizer, g) a processing aid and h) a coloring agent.

13. The power transmission belt according to claim 1 wherein the rubber composition in the cushion rubber layer is cross-linked with sulfur in an amount of 0.5–3.0 parts by weight per 100 parts by weight of ethylene-α-olefin elastomer.

14. The power transmission belt according to claim 1 wherein the load carrying cord comprises at least one of a polyester fiber, aramid fiber, and glass fiber.

15. The power transmission belt according to claim 14 wherein the fibers in the load carrying cord are subjected to an adhesion treatment preformed by at least one of a) immersing the fibers in the load carrying cord in a resorcinol-formalin-latex liquid, and b) pre-treating the fibers in the load carrying cord with at least one of an epoxy compound and an isocyanate compound and thereafter treating the fibers in the load carrying cord with a resorcinol-formalin-latex liquid.

16. The power transmission belt according to claim 1 wherein the power transmission belt further comprises a cover canvas on the body.

17. The power transmission belt according to claim 1 wherein the power transmission belt comprises one of a V-belt and a V-ribbed belt.

18. The power transmission belt according to claim 17 wherein the power transmission belt comprises at least one rib formed in the compression section.

19. The power transmission belt according to claim 1 wherein the ethylene-α-olefin elastomer comprises at least one of ethylene-propylene-diene-monomer-based rubber (EPDM) and an ethylene-propylene-based rubber (EPM).

20. The power transmission belt according to claim 7 wherein the body has laterally spaced sides to engage a cooperating pulley and the short fibers project laterally and outwardly from the laterally spaced sides of the body.

* * * * *